United States Patent [19]

Payne

[11] Patent Number: 5,022,838
[45] Date of Patent: * Jun. 11, 1991

[54] MULTI-AXIS ROTATIONAL DISTRIBUTING APPARATUS

[76] Inventor: LeRoy Payne, 3300 Nicholas La., Molt, Mont. 59057

[*] Notice: The portion of the term of this patent subsequent to Sep. 11, 2007 has been disclaimed.

[21] Appl. No.: 417,502

[22] Filed: Oct. 5, 1989

Related U.S. Application Data

[60] Continuation-in-part of Ser. No. 271,686, Nov. 16, 1988, Pat. No. 4,956,133, which is a continuation-in-part of Ser. No. 202,267, Jun. 6, 1988, Pat. No. 4,956,135, which is a continuation-in-part of Ser. No. 890,742, Jul. 30, 1986, Pat. No. 4,749,533, which is a division of Ser. No. 766,498, Aug. 19, 1985, Pat. No. 4,671,753.

[51] Int. Cl.$^5$ .................. B29C 41/06; B29C 41/52; B29C 67/20
[52] U.S. Cl. .................... 425/145; 249/155; 249/179; 264/40.7; 264/45.7; 264/310; 264/311; 264/313; 425/150; 425/375; 425/435; 425/449; 425/457; 425/470; 156/425
[58] Field of Search ............... 264/37, 39, 40.1, 40.7, 264/45.2, 45.5, 45.7, 219, 220, 225, 240, 310, 311, 313, 328.6, 328.7; 249/155, 179; 425/4 R, 110, 117, 129.1, 130, 135, 145, 150, 162, 166, 175, 176, 215, 216, 217, 225, 226, 429, 435, 543, 817 R, 375, 449, 457, 470; 156/425

[56] References Cited

U.S. PATENT DOCUMENTS

| | | | |
|---|---|---|---|
| 3,843,285 | 10/1974 | Nitta et al. | 425/4 R |
| 3,942,924 | 3/1976 | Schwartz | 425/110 |
| 4,017,234 | 4/1977 | Andrews et al. | 425/145 |
| 4,043,721 | 8/1977 | Lemelson | 425/4 R X |
| 4,057,607 | 11/1977 | Soehngen et al. | 264/28 |
| 4,150,074 | 4/1979 | Tilgner | 264/40.7 |
| 4,285,903 | 8/1981 | Lemelson | 264/310 |
| 4,314,963 | 2/1982 | Boden et al. | 264/328.6 |

FOREIGN PATENT DOCUMENTS

| | | | |
|---|---|---|---|
| 2576544 | 8/1986 | France | 264/45.7 |
| 49-36831 | 10/1974 | Japan | 425/429 |
| 60-94318 | 5/1985 | Japan | 264/45.7 |

Primary Examiner—Leo B. Tentoni
Attorney, Agent, or Firm—Arthur L. Urban

[57] ABSTRACT

Multi-axis rotational polymeric mixture distributing apparatus includes a raw material supplying portion, a supporting portion, a raw material mixing portion, a polymeric mixture distributing portion, a polymeric mixture accepting portion and a control portion. The raw material supplying portion includes a plurality of reservoirs, each connected independently with the mixing portion. The supporting portion includes a plurality of driven frame members each with a large open central area being disposed between parallel spaced upstanding end sections and rotatably supported thereon, each being progressively smaller in size than the next larger frame member and disposed within the open central area thereof. Alternate frame members are rotatable about aligned axes with frame members therebetween rotatable about axes generally perpendicular thereto. The smallest frame member includes rotatable holding sections. The raw material mixing portion includes a movable mixing chamber with withdrawable deflectors mounted adjacent the smallest frame member. A piston is selectively movable within the mixing chamber along the length thereof when the deflector sections are withdrawn therefrom. The polymeric mixture accepting portion includes a profile member with a surface having a desired configuration positionable between the holding sections and securable therebetween. The control portion includes a programmable memory.

25 Claims, 1 Drawing Sheet

MULTI-AXIS ROTATIONAL DISTRIBUTING APPARATUS

CROSS-REFERENCES TO RELATED APPLICATIONS

This application is a continuation-in-part of application Ser. No. 271,686, filed Nov. 16, 1988, now U.S. Pat. No. 4,956,133, which in turn is a continuation-in-part of application Ser. No. 202,267, filed June 6, 1988, now U.S. Pat. No. 4,956,135, which in turn is a continuation-in-part of application Ser. No. 890,742, filed July 30, 1986, now U.S. Pat. No. 4,749,533, which is a division of application Ser. No. 766,498, filed Aug. 19, 1985, now U.S. Pat. No. 4,671,753.

BACKGROUND OF THE INVENTION

This invention relates to a novel distributing apparatus and more particularly relates to a new rotational polymeric mixture distributing apparatus.

Throughout history, one of the most important activities in most civilizations has been the construction of buildings for various purposes such as dwellings, storage and the like. With primitive societies, it was common to construct such buildings from natural materials that were readily available. In forested areas, structures were erected with logs or boards that had been cut from the logs.

Where trees were less available, people used stone for building materials or more commonly artificial adobe substitutes formed from mud baked in the sun. To make artificial stones or bricks more durable and less likely to crumble, it was customary to mix straw or similar materials with the mud. These are believed to be the first reinforced products.

As civilizations developed, the use of reinforced products has become much more widespread. For example, concrete is formed from mixtures of cement and aggregates such as sand, crushed stone, rocks, etc. In addition, for greater strength metal rods, mesh fabric and the like may be incorporated therein. Wood products of this type include plywood and similar laminated units as well as particle board, wafer board and the like.

With the discovery of man-made polymers and resinous materials, the use of fillers and reinforcing materials therein has become common. These materials may be in a variety of forms including particles, fibers, rods, fabrics and the like.

One of the major problems is the proper incorporation of the reinforcing and/or filler materials into the continuous phase or matrix. Unless a high degree of care is exercised when the materials are combined with the principal component, they may be distributed non-uniformly and/or voids, bubbles and other weak spots may be created.

Even with fillers and reinforcing materials which can be properly placed within a matrix easily, there still is the problem of achieving uniformity of the composition of the matrix. For example, concrete mixes which include cement, water and an aggregate can become non-homogeneous simply by settling on standing. As a result, the trucks which deliver such mixes include drums that are rotated continuously in an attempt to maintain uniformity.

This problem of non-uniformity is significant in most batch processes. Although the obvious solution to the shortcomings of batch processes is continuous processing, most products still are produced on a batch or unit basis even though it might be a continuous batch process, that is, individual units or batches fabricated on an assembly line. As a result, reproduceable high quality remains a serious problem.

The production of man-made plastics and resins is an industry that utilizes a high degree of automatically controlled continuous processing. However, for units of appreciable size, batch processing still is the rule rather than the exception. For example, in the production of fiberglass structures such as boats, it is customary to construct the hulls by hand, building on an open mold in which a plurality of resin and fiberglass layers are sequentially laminated or a plurality of mixed resin/chopped fiber coatings are applied over the mold.

Such hand built products require a large amount of labor and supervision to insure that a reasonable level of quality is achieved. This greatly increases the cost of the product.

The problems of batch processing become more complicated when the resins or polymers are foam-forming. As a multi-component mixture is placed into an open mold, the first part of the mixture begins to foam and grow from the bottom of the mold as a result of an exothermic chemical reaction. The bubble size of the foam is smallest at the bottom where the reaction begins and is largest at the top of the mold as the reaction draws to completion. The resulting product is non-uniform in density from top to bottom and thus has poor structural strength and is unsatisfactory.

These limitations are especially significant in the fabricating of molds for molded products. Hand labor, frequent inspections, close supervision, etc. in making molds cause lengthy delays between the completion of the design and the start of production.

SUMMARY OF THE INVENTION

In view of the above discussion, it is clear that present manufacturing fabricating apparatus, methods and procedures do not provide the operating efficiencies and design possibilities required currently and in the future. Thus, there is a need for new apparatus and procedures that significantly reduce the time and expense required to get into production new products having a high degree of quality and uniformity.

The present invention provides a novel continuous apparatus which not only overcomes the deficiencies of present technology but also provides features and advantages not found in earlier expedients. The rotatable polymeric mixture distributing apparatus of the invention provides a simple and convenient means for greatly reducing the time required to get new products into production. The apparatus also facilitates the production of uniform high quality products efficiently and inexpensively.

The polymeric mixture distributing apparatus of the present invention is simple in design and can be produced relatively inexpensively. Commercially available materials and components can be utilized in the manufacture of the apparatus. Conventional metal fabricating procedures can be employed by semi-skilled labor in the manufacture of the apparatus. The apparatus is durable in construction and has a long useful life with a minimum of maintenance.

The apparatus of the invention can be modified to mold a wide variety of new structures. Variations both in product composition and configuration can be attained simply and conveniently with the apparatus of the invention. Even with such variations, uniformity and quality of product dimensions and composition are still maintained without difficulty.

These and other benefits and advantages of the novel rotatable polymeric mixture distributing apparatus of the present invention will be apparent from the following description and the accompanying drawings in which:

DESCRIPTION OF PREFERRED EMBODIMENTS

Figure 1:
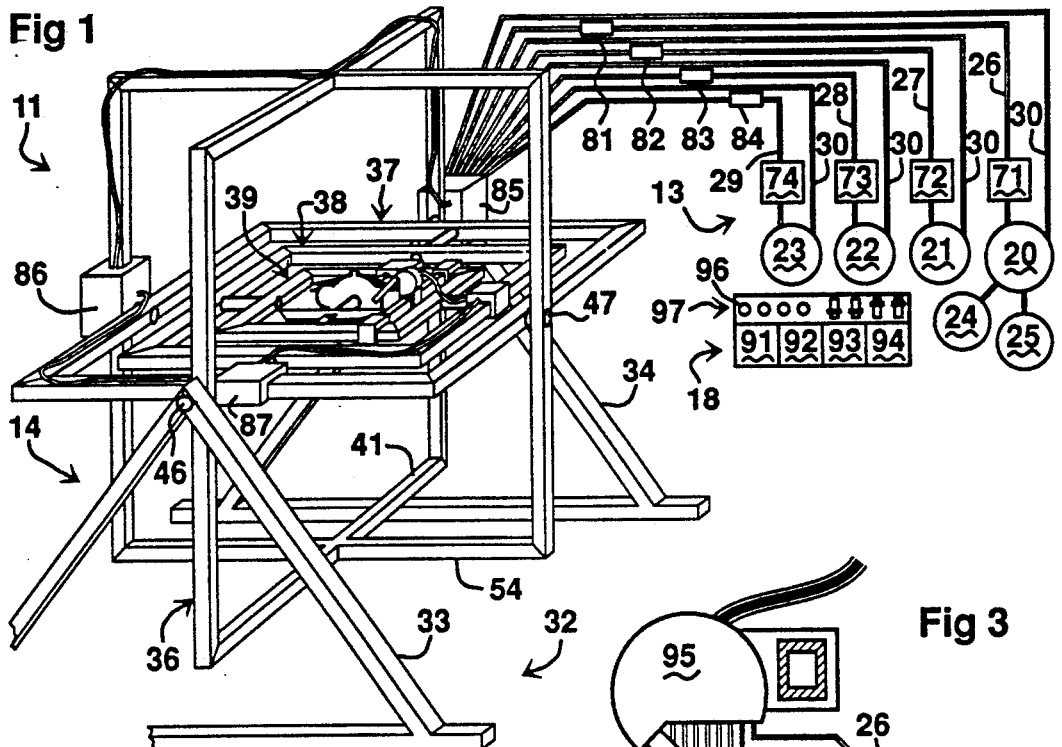
FIG. 1 is a view in perspective of one form of rotatable polymer mixture distributing apparatus of the invention.
Figure 2:
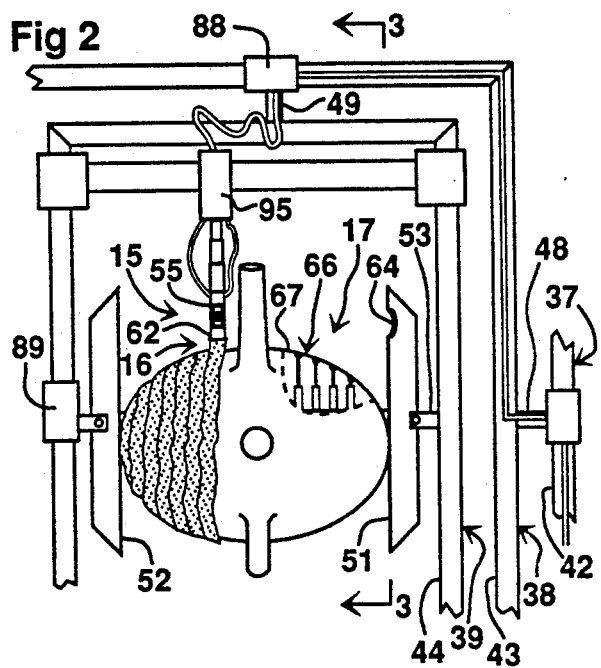
FIG. 2 is an enlarged fragmentary side view partially in section of the raw material mixing and polymeric mixture distributing and accepting portions of the apparatus shown in FIG. 1.

As shown in the drawings, one form of multi-axis rotational polymeric mixture distributing apparatus 11 of the present invention includes a raw material supplying portion 13, a supporting portion 14, a raw material mixing portion 15, a polymeric mixture distributing portion 16, a polymeric mixture accepting portion 17 and a control portion 18.

The raw material supplying portion 13 of the mixture distributing apparatus 11 of the invention includes a plurality of reservoirs 20, 21, 22, 23, 24 and 25. These reservoirs may include storage chambers for resin-forming materials, fillers, reinforcements, colors, catalysts, foam-forming materials, other additives, inert mixtures and the like. Reservoirs 24 and 25 are connected with reservoir 20 for premixing of inert materials therein prior to transfer to the mixing portion 15.

Figure 4:
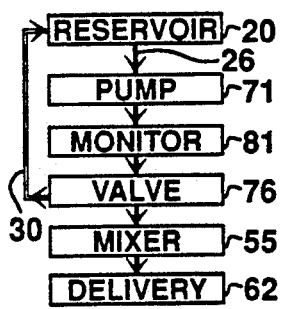
FIG. 4 is a schematic illustration of one form of control portion of the apparatus of the invention.

Reservoirs 20, 21, 22 and 23 of the raw material supplying portion 13 are independently connected to the raw material mixing portion 15 through conduit means 26, 27, 28 and 29. Advantageously, separate bypass return conduit means 30 extend from one end of each conduit 26-29 adjacent the mixing portion back to the respective reservoir 20-23 as illustrated in FIG. 4.

The supporting portion 14 of apparatus 11 of the present invention includes a base section 32 with generally parallel upstanding end sections 33 and 34. A plurality of frame members 36, 37, 38 and 39, each with a large open central area 41, 42, 43 or 44 extends between the upstanding end sections and is rotatably supported thereon. Each of the inner frame members 37, 38 and 39 is progressively smaller in size and is disposed within an open central area of the next larger frame member.

Alternate frame members shown in the drawings as members 36 and 38 are rotatable about aligned axes 46 and 48. The frame members therebetween 37 and 39 are rotatable about aligned axes 47 and 49 generally perpendicular to the first axes 46 and 48. The smallest frame member 39 includes rotatable holding sections 51 and 52 that extend inwardly along an axis 53 that also is perpendicular to axis 49 of that frame member.

Advantageously, the smaller frame members 37, 38 and 39 are generally centered within the open central area 41, 42 and 43 of the next larger frame members 36, 37 and 38 respectively. The outer largest frame member 36 preferably includes a cross frame section 54. The cross frame section 54 advantageously is disposed in a plane substantially perpendicular to a plane through the outer frame member 36. The cross frame section preferably is disposed symmetrically of the outer frame member 36.

The frame members 36-39 advantageously are of a generally multi-angular configuration. Preferably, the frame members are of a quadrangular configuration and most preferably a square configuration as shown in the drawings. The frame members advantageously are formed of tubing, preferably with a quadrangular, e.g. square cross section. Advantageously, the raw material conduits 26-29 and electrical conductors for energizing drive means are disposed along the frame members.

The raw material mixing portion 15 of the distributing apparatus 11 of the invention includes a mixing chamber 55. The mixing chamber is mounted adjacent the smallest frame member 39. The mixing chamber is mounted for controlled movement substantially parallel to the rotational axis of the holding sections 51 and 52.

The mixing portion 15 also includes a plurality of spaced deflector sections 57. The deflector sections are positionable selectively within the mixing chamber 55 along the length of the chamber. Means 58 shown as drive assemblies 59 are provided for withdrawing the deflector sections from the mixing chamber.

Piston means 61 is selectively movable within the mixing chamber along the length thereof when the deflector sections are withdrawn therefrom. Advantageously, the assemblies 59 provide rotation or changing of the orientation of the deflector sections when they are disposed within the mixing chamber. The deflector sections preferably extend into the mixing chamber radially of the axis of the chamber.

The polymeric mixture distributing portion 16 of the apparatus 11 includes delivery means 62 which is movable in a controlled motion. The delivery means 62 extends from the mixing chamber 55 toward the axis of the holding sections 51 and 52. The distributing portion advantageously includes extendable flexible conduit means 63 to facilitate positioning of the delivery means. Preferably, the extendable conduit means is selectively joinable with a passage 64 extending through a holding section 51 or 52 that communicates with the polymeric mixture accepting portion 17 as described hereafter.

The polymeric mixture accepting portion 17 includes a profile member 66 with a surface having a desired configuration. The profile member 66 is positionable between the holding sections 51 and 52 extending inwardly from the smallest frame member 39. The holding sections secure the profile member in place during rotation thereof and the deposition of the polymeric mixture thereon. The profile member may include one or more passages therethrough communicating with holding section passage 64 for delivery of the polymeric mixture therein.

The profile member 66 advantageously includes a flexible surface covering 67 with a plurality of surface supporting elements 68 bearing against the surface covering. The surface supporting elements 68 provide changes in the profile of the surface covering. Preferably, the surface supporting elements are movable radially of the axis of the profile member. Most preferably, the movement of the surface supporting elements is produced through drive means 69.

Figure 3:
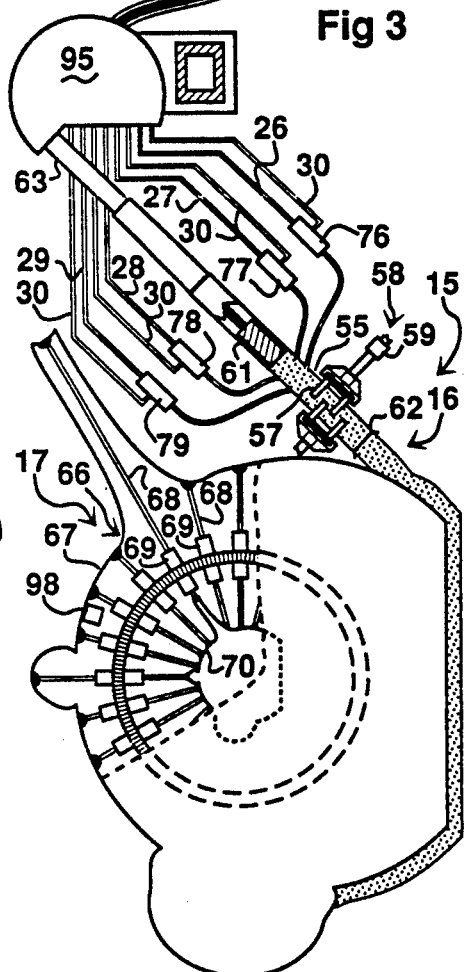
FIG. 3 is a further enlarged fragmentary sectional view of portions of the apparatus shown in FIGS. 1 and 2 taken along line 3—3 of FIG. 2.

The surface supporting elements 68 may be disposed outside the surface covering or inside the surface covering. Greater versatility is achieved with a profile member including two (outer and inner) surface coverings 67 and 70 with the surface supporting elements disposed therebetween as shown in FIG. 3.

The control portion 18 of the rotatable distributing apparatus 11 of the invention includes pump means 71, 72, 73 and 74; valve means 76, 77, 78 and 79 and flow monitoring means 81, 82, 83 and 84 disposed along the length of each raw material conduit means 26, 27, 28 and 29. Also, independent drive means 85, 86, 87 and 88 are disposed adjacent the axis of each frame member 36, 37, 38 and 39. The drive means provide rotation of each frame member; independently of the other frame sections. Advantageously, the frame member drive means are reversible to facilitate the distribution of the polymeric mixture over the surface of the profile member 66.

The control portion 18 also includes programmable memory means 91 and actuating means 92 responsive thereto, advantageously in combination with coordinating means 93 to control the operation of the pumps, valves and drives. Preferably, the coordinating means includes a process controller 94 that initiates changes in the flows of materials and speeds of drives to bring variations therein back to the rates specified in the programs present in the memory 91.

This coordination commonly is achieved through the transmission of information such as digital pulses from the monitors and/or sensors at the control components to the process controller 94. The operating information is compared with the preselected programming parameters stored in the memory. If differences are detected, instructions from the controller change the operation of the components to restore the various operations to the preselected processing specifications.

In the use of the polymeric mixture distributing apparatus 11 of the present invention, the design of the product desired first is established. The design can be copied from a sample of a similar product.

Copying a product sample can be accomplished in several ways. The sample may be positioned and secured between the holding sections 51 and 52. Thereafter, a polymeric mixture is deposited on the rotating sample such as by depositing a polymer ribbon continuously over the sample profile in an overlapping pattern with drive 95.

During and subsequent to the deposition of the polymer, the drive means 85-88 for the specific frame members 36-39 are activated as required to flow the polymeric mixture over the surface and form a substantially uniform polymeric layer over the entire sample. The polymer covered sample may be removed when the polymeric layer is sufficiently cured to be self-supporting without distorting the profile thereof, or the deposition of the polymeric mixture may be continued to build a thick support backing thereover.

When the covered sample is removed from the apparatus, the outer polymeric shell is divided into at least two sections. The sample is removed and the sections of the polymeric shell become a multi-piece mold assembly which can be reinforced further if desired.

More advantageously, the design of a product to be produced can be programmed into the profile memory by mounting profile member 66 in the apparatus 11 between holding sections 51 and 52. At this point, a product sample is inserted into the profile member 66, the drive means 69 moves the supporting elements 68 against the flexible internal surface covering 70 and advances it into intimate contact with the entire surface of the sample. The memory means 91 of the control portion then is programmed for the configuration of the sample. Thereafter, the supporting elements withdraw, permitting the surface covering 70 to release from the sample surface so the sample can be separated from the profile member. In this way, a mold assembly for duplicating the product sample has been created quickly and easily.

If it is desired to make a production mold to be used for an extended period of time, a mold assembly can be made using a profile member with an external surface covering 67. Thus, when the internal surface covering 70 is in close contact with the entire surface of the sample, the external surface covering 67 is oriented in the same configuration. A polymeric mixture can be deposited on the surface covering in the same way as described above with the direct coating of the sample to produce a mold assembly with an internal cavity for molding duplicates of the sample.

Another procedure for producing a mold assembly is to generate a desired design in a computer directly and then transfer the design information into the memory of the control portion 18 so it can subsequently shape the surface covering of the profile member 66 as described above using the sample.

To start the operation of the apparatus 11, buttons and/or switches 96 of a control panel 97 are depressed to activate the memory 91 and the other components of the control portion 18. The coordinating means 93 energizes frame member rotation drive means 85-88 and when profile member 66 is employed energizes supporting element drive means 69.

Also, the pumps 71-74, the valves 76-79 and the flow monitors 81-84 are energized by the coordinating means 93 in the preselected sequences of the program stored in the memory 91. This causes the raw materials in reservoirs 20-23 to advance along the conduits 26-29 toward the mixing portion 15. For example, to mold a product including a foamed polyurethane resin, reservoir 20 may contain a previously prepared mixture of an isocyanate and gravel as a filler from reservoirs 24 and 25, reservoir 21 may contain a polyol, reservoir 22 foam forming materials and 23 and other reservoirs—colors, catalysts, etc. as required.

To produce high quality molded units of the invention, it is important that the raw material delivered to the mixing chamber 55 be uniform in volume and composition. This can be facilitated by providing a continuous flow of raw materials to the mixing portion and the immediate transfer of the mixture therefrom onto the polymeric mixture accepting surface. However, the volume of the mixture delivered will vary depending upon the particular incremental area being covered at any instant. Also, the delivery will be terminated completely when a molded unit is being removed from the apparatus.

Advantageously, as shown in FIG. 4, a separate bypass conduit 30 is utilized from the end of each conduit 26-29 at a point adjacent the mixing chamber 55 back to the respective reservoir 20-23. This construction provides for the delivery of a freshly formed uniform mixture from the mixing chamber even though the distance is considerable between the reservoirs and the mixing chamber which is located closely adjacent the mixture accepting surface. The control portion 18 coordinates the operation of the various system components so the required formulation can flow onto the desired areas.

When the desired volume of the mixture has been deposited, the deflector sections 57 are withdrawn from the mixing chamber 55. Then, the piston member 61 moves forward into the mixing chamber pushing out any material therein and cleaning the mixing chamber for receiving the next ingredients. With the piston 61 disposed in the mixing chamber, rotation of the frame sections 36-39 is continued to complete the flow of the mixture over all surfaces being covered.

The rotations are controlled within the parameters stored in the memory 91. For particular units, the rotations about the respective axes may be continuous and/or intermittent at changing rates. Also, it may be desirable to provide arcuate rotation, that is, movement about an arc such as a rocking motion. Advantageously, monitors 98 located adjacent the mixture accepting surface inform the process controller 94 when the mixture has flowed over all surfaces.

The components of the polymeric mixture that has been deposited quickly begin to react to form a solid structure while rotational movement of the profile member continues. The mixture initially deposited forms a hard covering with a high density with little or no bubble formation. As the reaction rate increases due to the exothermic reaction of the resin formation, the foam formed decreases in density.

The foam density decreases substantially uniformly as the spacing from the surfaces increases. This decrease in density continues unless the expanding foams meet another foam. At these boundaries, a thin high density central barrier is formed.

When the product is sufficiently cured, the rotation is stopped and the molded unit is freed from the apparatus. The separated molded unit is set aside to complete the foam formation and/or the curing of the resin therein. During this period, the final expansion of the foam, free of the mold's restraint, stresses the high density outer skin or layer of the product. This stressing of the skin increases the strength and puncture resistance thereof and also the structural strength of the molded product itself. The structural strength of the product can be enhanced further by including a reinforcement such as metal or fiberglass fibers in the mixture prior to molding. Also, preformed reinforcements 106 e.g. metal wire can be utilized.

Figure 5:
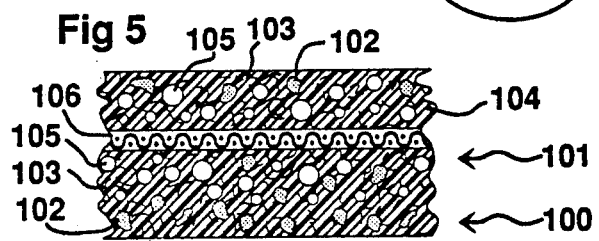
FIG. 5 is an enlarged fragmentary cross-sectional view of a molded unit of the invention.

FIG. 5 illustrates an enlarged cross-sectional view of a molded unit of the invention produced employing the apparatus and method described above. As shown, the unit includes a high density stressed outer layer 100 with a less dense layer 101 extending therefrom. Filler particles 102 and fiber reinforcements 103 are distributed throughout the product. Resin matrix 104 surrounds individual filler particles 102, fiber reinforcements 103 and gas bubbles 105.

Advantageously, the stressed outer layer 100 includes a somewhat greater concentration of hard filler particles 102 and the foamed layer 101 includes a somewhat greater concentration of the fiber reinforcement 103. Thus, the present invention provides a novel molded product that is a unitary structure with an integral hard outer surface over a more flexural strong backing and includes high proportions of fillers and/or reinforcements.

The above description and the accompanying drawings show that the present invention provides a novel rotational polymeric mixture distributing apparatus which not only overcomes the deficiencies and shortcomings of earlier expedients, but in addition provides novel features and advantages not found in previous apparatus. The distributing apparatus of the invention provides a simple and convenient means for reducing significantly the time required to advance from a design to the production stage. This is true whether the design is embodied in a prototype, in a conventional drawing or is a computer generated design.

The apparatus of the invention is simple in design and relatively inexpensive. Commercially available materials and components can be utilized in the fabrication of the apparatus using conventional metal working techniques and procedures.

Products can be produced efficiently with the apparatus by operators with limited experience and aptitude after a short period of instruction. The apparatus is durable in construction and has a long useful life with a minimum of maintenance.

The apparatus of the invention can be utilized to mold a wide variety of different products. Variations in composition, structure and configuration of the products can be achieved simply and quickly with the apparatus of the invention.

It will be apparent that various modifications can be made in the rotational polymeric mixture distributing apparatus described in detail above and shown in the drawings within the scope of the present invention. The size, configuration and arrangement of components and materials can be changed to meet specific requirements. For example, the number of components and reservoirs may be different. Also, the apparatus may include other drive and actuating components and mechanisms. These and other changes can be made in the apparatus described provided the functioning and operation thereof are not adversely affected. Therefore, the scope of the present invention is to be limited only by the following claims.

What is claimed is:

1. Multi-axis rotational polymeric mixture distributing apparatus including a raw material supplying portion, a supporting portion, a raw material mixing portion, a polymeric mixture accepting portion and a control portion; said raw material supplying portion including a plurality of reservoirs, reservoirs being connected independently with said mixing portion through conduit means; said supporting portion including a base section with generally parallel spaced upstanding end sections, a plurality of frame members each with a large open central area being disposed between said upstanding end sections and rotatably supported thereon, each of said frame members being progressively smaller in size and disposed within said open central area of a next larger frame member, alternate frame members being rotatable about aligned axes with frame members therebetween being rotatable about axes generally perpendicular thereto, the smallest frame member including rotatable holding sections extending inwardly toward one another along an axis perpendicular to the axis of said smallest frame member; said raw material mixing portion including a mixing chamber mounted adjacent said smallest frame member, a plurality of spaced deflector sections selectively positionable within said mixing chamber along the length thereof, means for withdrawing said deflector sections from said mixing chamber and piston means selectively movable within said mixing chamber along the length thereof when said deflector sections are withdrawn therefrom; said polymeric mixture distributing portion including movable delivery means extending from said mixing chamber toward said axis of said holding sections; said polymeric mixture accepting portion including a profile member with a surface having a desired configuration positionable between said holding sections and securable therebetween; said control portion including pump means, valve means and flow monitoring means disposed along each conduit means, independent drive means disposed adjacent the axis of each frame member providing rotation thereof independently of other frame members, programmable memory means and actuating means responsive thereto controlling and activating said pump means, said valve means and said drive means.

2. Multi-axis rotational polymeric mixture distributing apparatus according to claim 1 wherein said profile member includes a flexible surface covering and a plurality of surface supporting elements bearing against said surface covering and providing changes in the configuration thereof.

3. Multi-axis rotational polymeric mixture distributing apparatus according to claim 2 wherein said surface supporting elements are movable radially of the axis of said profile member.

4. Multi-axis rotational polymeric mixture distributing apparatus according to claim 2 including drive means activating movement of said surface supporting elements.

5. Multi-axis rotational polymeric mixture distributing apparatus according to claim 2 wherein said surface supporting elements are disposed outside said flexible surface covering.

6. Multi-axis rotational polymeric mixture distributing apparatus according to claim 2 wherein said surface supporting elements are disposed inside said flexible surface covering.

7. Multi-axis rotational polymeric mixture distributing apparatus according to claim 2 wherein said surface supporting elements are disposed between inner and outer flexible coverings.

8. Multi-axis rotational polymeric mixture distributing apparatus according to claim 1 wherein said smaller frame members are generally centered within said open central area of said next larger frame member.

9. Multi-axis rotational polymeric mixture distributing apparatus according to claim 1 wherein a outer frame member of said supporting portion includes a cross frame section, a plane of said cross frame section being disposed substantially perpendicular to a plane of said outer frame member.

10. Multi-axis rotational polymeric mixture distributing apparatus according to claim 9 wherein said cross frame section is disposed symmetrically of said outer frame member.

11. Multi-axis rotational polymeric mixture distributing apparatus according to claim 1 wherein said frame members are of a generally multi-angular configuration.

12. Multi-axis rotational polymeric mixture distributing apparatus according to claim 11 wherein said frame members are of a quadrangular configuration.

13. Multi-axis rotational polymeric mixture distributing apparatus according to claim 1 wherein said frame members are formed of quadrangular tubing.

14. Multi-axis rotational polymeric mixture distributing apparatus according to claim 13 wherein said tubing has a square cross section.

15. Multi-axis rotational polymeric mixture distributing apparatus according to claim 1 wherein said frame member drive means are reversible.

16. Multi-axis rotational polymeric mixture distributing apparatus according to claim 1 wherein said drive means for said frame members are energized by electrical conductors disposed along said frame members.

17. Multi-axis rotational polymeric mixture distributing apparatus according to claim 1 wherein said raw material mixing portion is mounted for movement substantially parallel to the rotational axis of said holding sections.

18. Multi-axis rotational polymeric mixture distributing apparatus according to claim 1 wherein said raw material supplying portion includes separate bypass return conduit means from one end of each of said conduit means adjacent said mixing portion back to the respective reservoir.

19. Multi-axis rotational polymeric mixture distributing apparatus according to claim 1 wherein said conduit means are disposed along said frame members.

20. Multi-axis rotational polymeric mixture distributing apparatus according to claim 1 wherein said raw material mixing portion includes drive means for selectively rotating said deflector sections when disposed within said mixing chamber.

21. Multi-axis rotational polymeric mixture distributing apparatus according to claim 1 wherein said deflector sections extend radially into said mixing chamber.

22. Multi-axis rotational polymeric mixture distributing apparatus according to claim 1 wherein said polymeric mixture distributing portion includes extendable flexible conduit means.

23. Multi-axis rotational polymeric mixture distributing apparatus according to claim 22 wherein one of said holding sections includes a passage therethrough communicating with said polymeric mixture accepting portion.

24. Multi-axis rotational polymeric mixture distributing apparatus according to claim 23 wherein said movable delivery means of said polymeric mixture distributing portion is selectively joinable with said holding section passage.

25. Multi-axis rotational polymeric mixture distributing apparatus according to claim 1 wherein said control portion includes coordinating means.

* * * * *